(12) United States Patent
Ki et al.

(10) Patent No.: US 10,472,826 B2
(45) Date of Patent: Nov. 12, 2019

(54) REINFORCING BAR COUPLER FOR SPIRAL REINFORCING BAR

(71) Applicant: Eun Kwan Ki, Uiryeong-gun, Geongsangnam-do (KR)

(72) Inventors: Eun Kwan Ki, Uiryeong-gun (KR); Heon Yang Kweon, Changwon-si (KR)

(73) Assignee: Eun Kwan KI, Uiryeong-Gun (KR)

( * ) Notice: Subject to any disclaimer, the term of this patent is extended or adjusted under 35 U.S.C. 154(b) by 273 days.

(21) Appl. No.: 15/309,752

(22) PCT Filed: May 7, 2015

(86) PCT No.: PCT/KR2015/004569
§ 371 (c)(1),
(2) Date: Nov. 8, 2016

(87) PCT Pub. No.: WO2015/170896
PCT Pub. Date: Nov. 12, 2015

(65) Prior Publication Data
US 2017/0138050 A1    May 18, 2017

(30) Foreign Application Priority Data

May 9, 2014    (KR) .......................... 10-2014-0055209

(51) Int. Cl.
*E04C 5/16*    (2006.01)
*F16B 7/18*    (2006.01)
*E04G 21/12*    (2006.01)

(52) U.S. Cl.
CPC .............. *E04C 5/165* (2013.01); *E04G 21/12* (2013.01); *F16B 7/18* (2013.01)

(58) Field of Classification Search
CPC ........ E04C 5/16; E04C 5/18; Y10T 403/5733; Y10T 403/5746; F16B 7/182
See application file for complete search history.

(56) References Cited

U.S. PATENT DOCUMENTS

| 1,576,677 | A | * | 3/1926 | Scheibeler | .......... E21B 17/0426 403/305 |
| 2,049,265 | A | * | 7/1936 | Kinney | ............... E21B 17/1071 166/241.2 |
| 3,782,839 | A | * | 1/1974 | Majewski | ............... E04C 5/165 403/307 |
| 4,143,986 | A | * | 3/1979 | Antosh | .................. E04C 5/165 403/307 |

(Continued)

FOREIGN PATENT DOCUMENTS

| CN | 201072316 Y | 6/2008 |
| CN | 201972316 U | 9/2011 |

(Continued)

*Primary Examiner* — Jonathan P Masinick
(74) *Attorney, Agent, or Firm* — Maschoff Brennan

(57) ABSTRACT

The present invention relates to a reinforcing bar coupler, for a spiral reinforcing bar, for coupling a pair of spiral reinforcing bars in a straight line, which includes, at one side of the inner part thereof, a protrusion accommodating groove screw-coupled to a spiral protrusion of the spiral reinforcing bar, and a loading part formed to have an inner diameter larger than an outer diameter of the spiral reinforcing bar, such that the end part of the spiral reinforcing bar is accommodated therein without rotation.

3 Claims, 6 Drawing Sheets

(56) References Cited

U.S. PATENT DOCUMENTS

| | | | | |
|---|---|---|---|---|
| 4,295,751 A | * | 10/1981 | Holmberg | E21B 17/0426 285/334 |
| 4,309,122 A | * | 1/1982 | Schosek | F16B 7/182 403/307 |
| 4,955,645 A | * | 9/1990 | Weems | F16B 7/182 285/355 |
| 5,067,844 A | * | 11/1991 | Bowmer | E04C 5/165 403/305 |
| 5,606,839 A | * | 3/1997 | Baumann | E04C 5/165 403/305 |
| 6,880,224 B2 | * | 4/2005 | Colarusso | B21O 5/00 29/456 |
| 2006/0108805 A1 | | 5/2006 | Papousek | |

FOREIGN PATENT DOCUMENTS

| | | |
|---|---|---|
| JP | H108-120831 A | 5/1996 |
| JP | 2003-278316 A | 10/2003 |
| JP | 2008-075415 A | 4/2008 |
| JP | 3165895 U | 2/2011 |
| JP | 2014-020025 A | 2/2014 |
| KR | 20-0409526 Y1 | 3/2006 |
| KR | 10-2011-0110385 A | 10/2011 |
| WO | 02/084041 A1 | 10/2002 |
| WO | 2004/013531 A1 | 2/2004 |
| WO | 2014/042314 A1 | 3/2014 |

* cited by examiner

[Fig. 1]
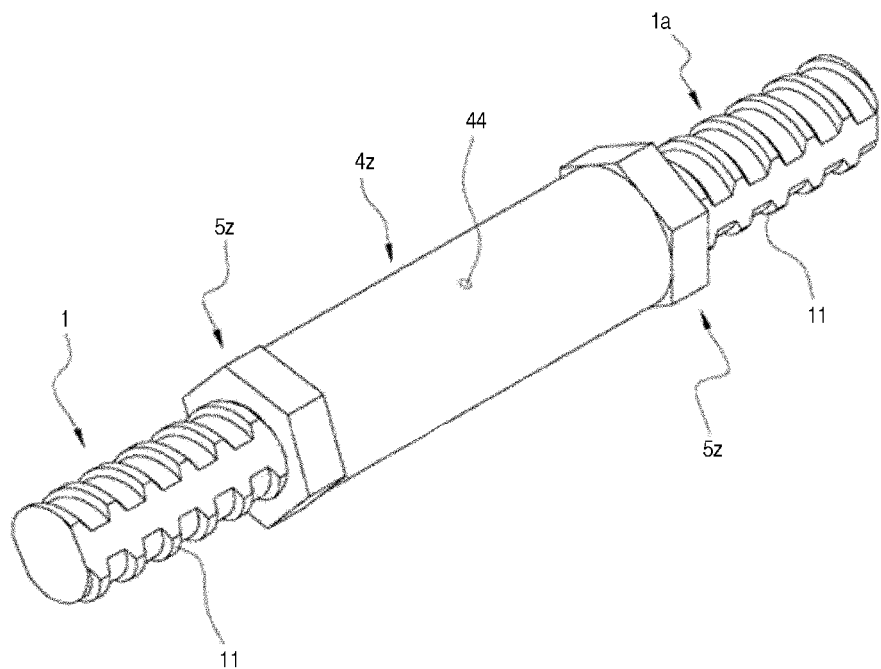
[Fig. 2]
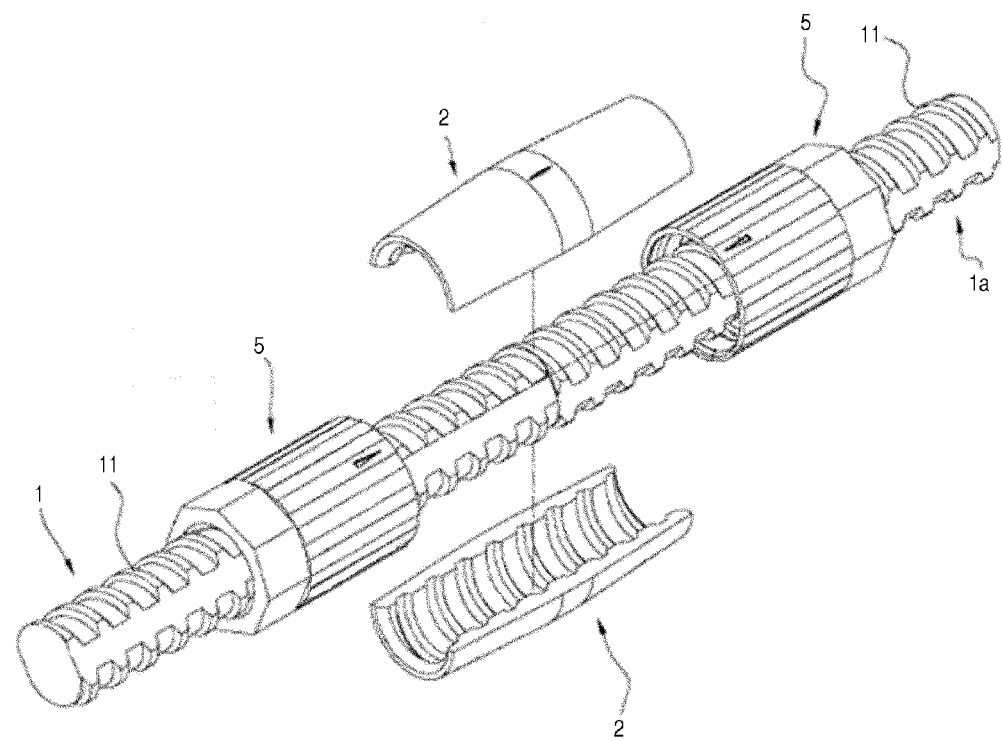

[Fig. 3]
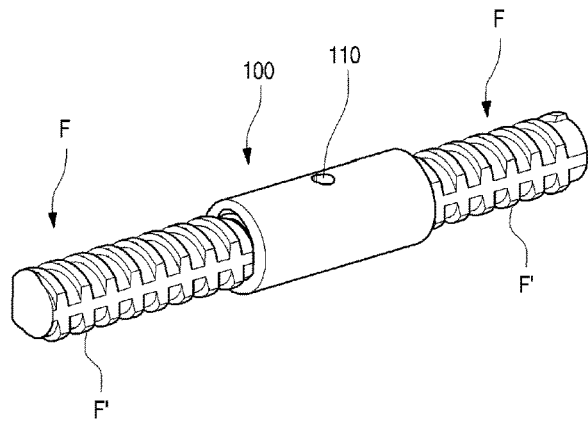
[Fig. 4]
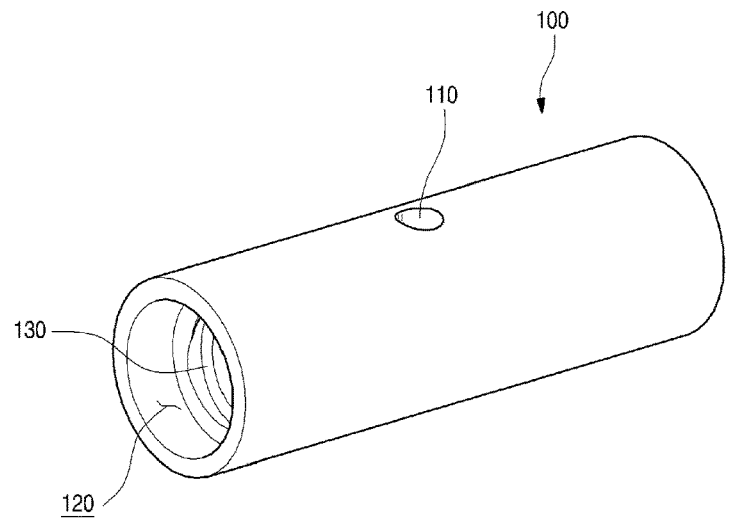
[Fig. 5]
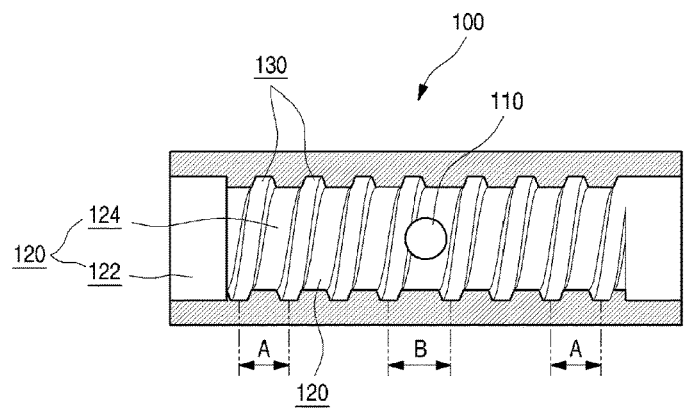

[Fig. 6]
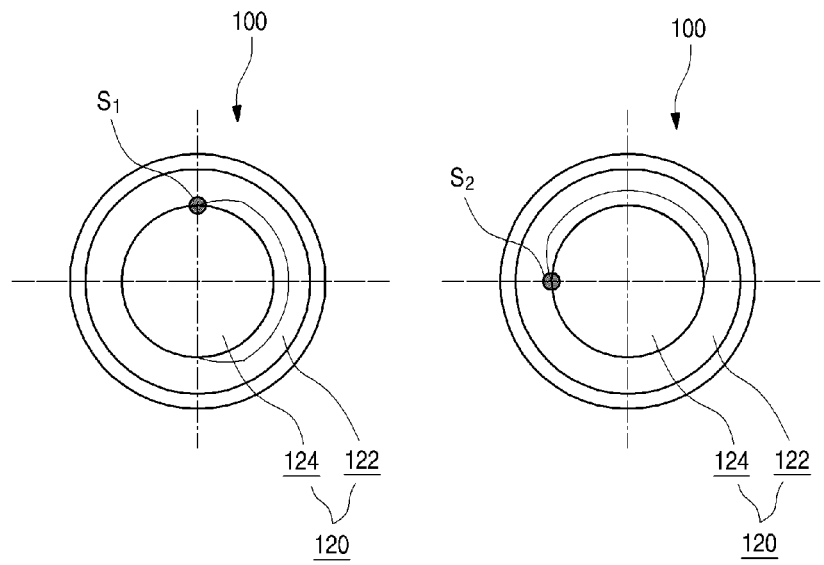
[Fig. 7]
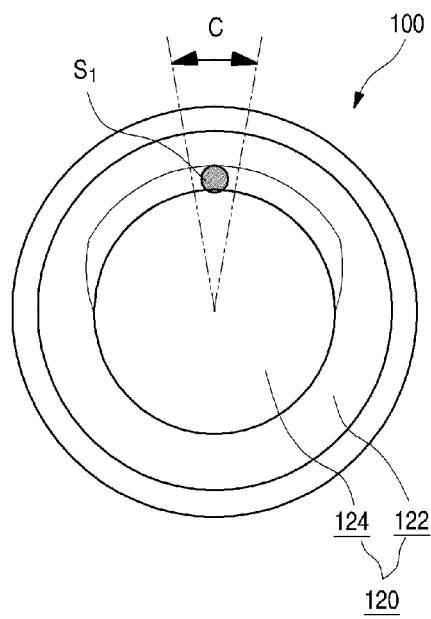

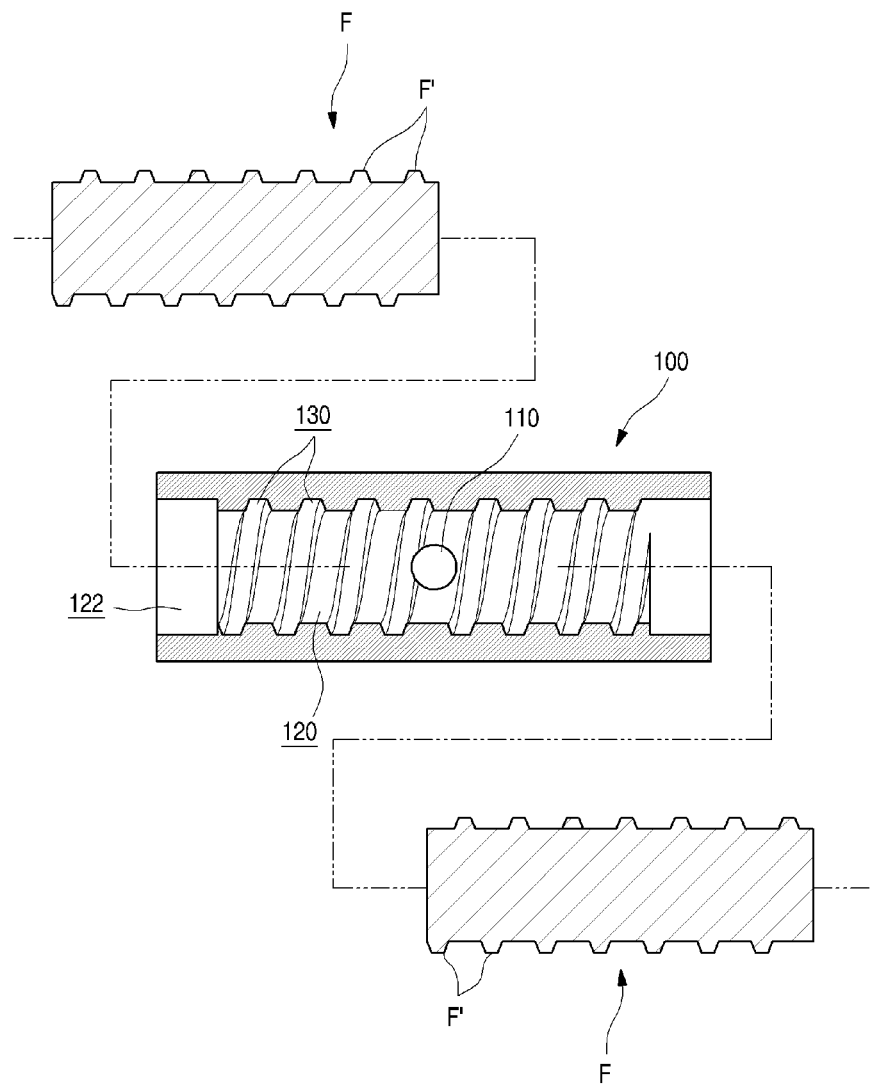
[Fig. 8]

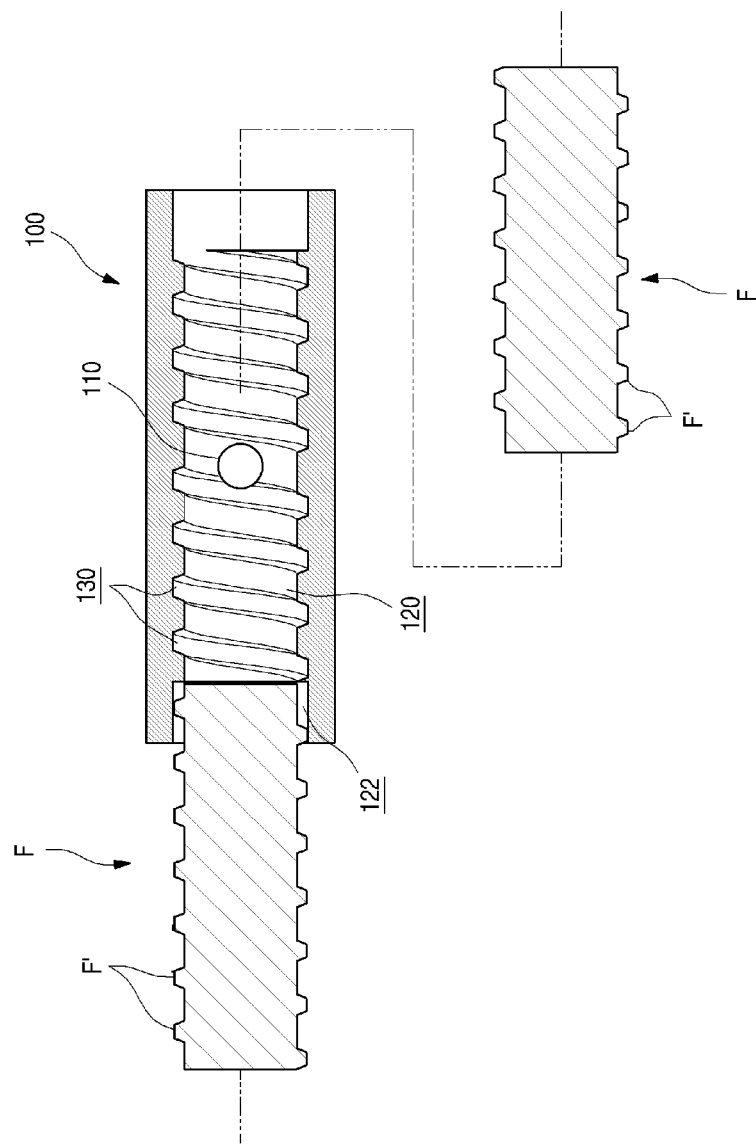
[Fig. 9]

[Fig. 10]
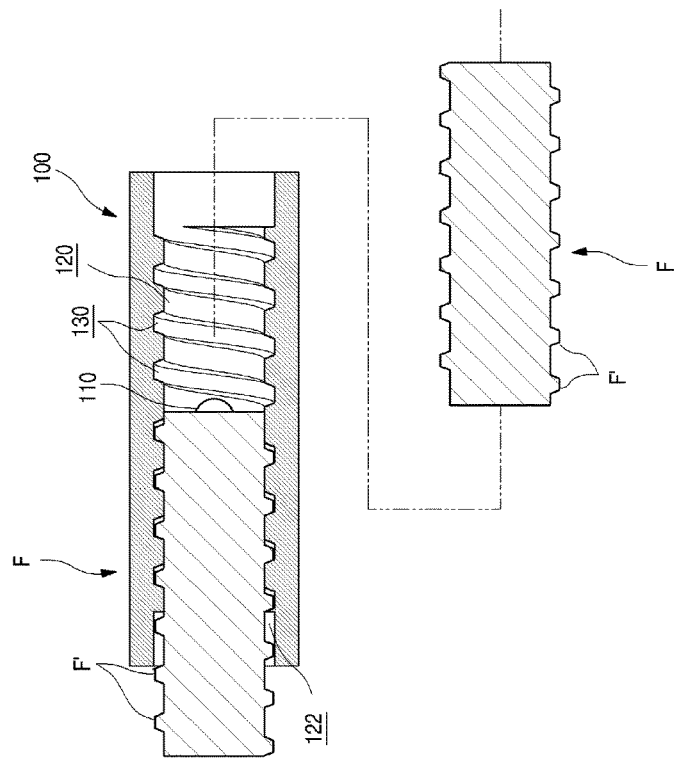
[Fig. 11]
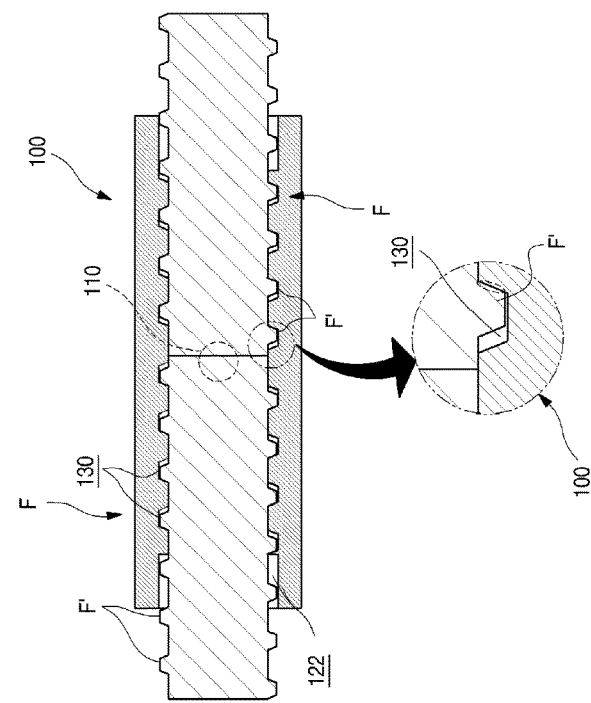

REINFORCING BAR COUPLER FOR SPIRAL REINFORCING BAR

TECHNICAL FIELD

The present invention relates to a reinforcing bar coupler, and in particular to a reinforcing bar coupler for a spiral reinforcing bar which has a simplified configuration since it is formed of a single component, wherein a loading part larger than an outer diameter of a spiral reinforcing bar is provided at both inner sides, so a spiral reinforcing bar can be inserted and loaded at a predetermined depth, thus enhancing a connection work.

The present invention relates to a reinforcing bar coupler for a spiral reinforcing bar which is able to provide an easier connection process in such a way to limit the insertion depths of a pair of spiral reinforcing bars accommodated by a screw coupling method at both sides.

The present invention relates to a reinforcing bar coupler for a spiral reinforcing bar which makes it possible to limit any movements after a coupling work is completed in such a way that a repulsive force is generated in a state where the ends of a pair of spiral reinforcing bars accommodated in the inside are abutting upon each other.

The present invention relates to a reinforcing bar coupler for a spiral reinforcing bar wherein a defective assembling can be easily inspected, for example, in such a way to visually check the inside with eyes after a reinforcing bar has been coupled.

BACKGROUND ART

In the construction of a reinforcing bar concrete structure, in general, a deformed bar is mainly used as a reinforcing bar, wherein joints protrude in the horizontal direction and two line ribs are formed symmetrical over the whole length so as to enhance a coupling stress intensity with a concrete. Since the reinforcing bar is manufactured with a limited length for the sake of easier transportations or work conveniences, the reinforcing bars are coupled and used. There are a variety of deformed bar coupled ways.

The most widely used connection method is an overlapped joint method wherein the ends of two reinforcing bars are overlapped and tied using a tying wire. In this method, since the joint parts are supported by only an attaching force of the reinforcing bar, the safety may be degraded. In the gas pressure welding method wherein the ends of two steels are heated using an oxygen-acetylene gas flame and are coupled by pressing using a pressure welding machine, a thermal deformation may occur at the joint parts, thus causing a secondary stress, for which the joint parts may become weaker than a steel basic material. In a screw coupling method wherein both ends of each of two reinforcing bars are upset or a rib and a joint are processed into a circular shape through a casting, and a male screw is processed in a cutting and form-rolling method and is coupled using a female screw type coupler, an external force may be applied to the reinforcing bars, so a predetermined deformation may occur, which is different at the steel basic material. For this reason, it may become weaker than the basic material.

According to the regulation on the manufacturing of the reinforcing bars, the reinforcing bars are regulated to be manufactured while maintaining a material property which is similar with a concrete in terms of a thermal expansion ratio so as to prevent the steel concrete structure from being easily broken when heat is applied thereto. According the Korean regulation on the coupling of the reinforcing bars, the aforementioned overlapping coupling method is not allowed for the coupling of the reinforcing bars wherein the names of the steels are over D29 (the diameter is 29 mm), the reinforcing bars are being coupled by the gas pressure welding method or the mechanical method. This method, however, may need a secondary processing to supply heat or an external force to the reinforcing bar, so the natural material properties of the reinforcing bars could be lost. The reason why this method is inevitably allowed is that a variety of the reinforcing bar couplers are being developed, which are able to couple without changing the natural reinforcing bar properties.

In addition, recently according to the needs of the full couple method, as shown in FIG. 1, screw joint reinforcing bars 1 and 1a are developed, wherein a screw ridge type screw joint 11 is formed on the outer surface of a reinforcing bar. The screw joint reinforcing bars are coupled through a sleeve 4z having a female screw part 41 to which the screw joints 11 of the reinforcing bars 1 and 1a are engaged.

However, the pitches of the screw joints 11 of the reinforcing bars 1 and 1a are long, and the screws are formed inaccurate, for which the screw valley of the female screw 41 of the sleeve 4z is formed larger than the screw joint 11 of the reinforcing bars 1 and 1a for the sake of smooth engagements. In this state, if the two reinforcing bars 1 and 1a are coupled using the sleeve 4z, the space between the sleeve 4z and the reinforcing bars 1 and 1a may increase, which may cause an easier disengagement together with a slipping, thus causing a problem.

In order to resolve this problem, a lock nut 5z may be engaged to both ends of the sleeve 4z, and a grout material is filled in the inside of the sleeve 4z so as to remove any space. In this case, a work for preparing and charging a grout material may be complicated, and since the strength of the grout material is less than 10% of the reinforcing bar, a safe coupling may not be secured. Since the pitches of the reinforcing bars 1 and 1a are long, the slope angle of the screw ridge may be large, which may result in a lot of necessary force for the engagement of the lock nut 5z, and the lock nut 5z may be easily loosened by external vibrations, thus causing a safety problem.

Since two lock nuts 5z are provided in the form of separate components, not integrated with the sleeve 4z, the management of the components is hard, and since the lock nut 5z is relatively small-sized, a risk for the accident due to the falling of the lock nut may increase during a coupling work, for which a demand for a reinforcing bar coupler increases, which can be used for a temporal coupling due to a construction site which needs more cost saving through an enhanced safety and construction capability and a faster work speed.

In order to resolve the aforementioned problems, the Korean utility model registration number 0409526 describes a technology wherein as illustrated in FIG. 2, a semicircular sleeve 2 is provided, which is able to be loaded while covering screw joints 11, and both inclined sides of the semicircular sleeve 2 can be pressed in such a way to tighten a lock nut 5 at the left and right sides of the semicircular sleeve 2, thus coupling the spiral reinforcing bar 1a.

Since the aforementioned conventional technology requires a number of components, the construction performance may be degraded, thus causing a problem.

DISCLOSURE OF INVENTION

Technical Problem

The present invention are directed to providing a reinforcing bar coupler for a spiral reinforcing bar which has a simplified configuration since it is formed of a single component, wherein a loading part larger than an outer diameter of a spiral reinforcing bar is provided at both inner sides, so a spiral reinforcing bar can be inserted and loaded at a predetermined depth, thus enhancing a coupling work.

The present invention are directed to providing a reinforcing bar coupler for a spiral reinforcing bar which is able to provide an easier coupling process in such a way to limit the insertion depths of a pair of spiral reinforcing bars accommodated by a screw coupling method at both sides.

The present invention are directed to providing a reinforcing bar coupler for a spiral reinforcing bar which makes it possible to limit any movements after a coupling work is completed in such a way that a repulsive force is generated in a state where the ends of a pair of spiral reinforcing bars accommodated in the inside are abutting upon each other.

The present invention are directed to providing a reinforcing bar coupler for a spiral reinforcing bar wherein a defective assembling can be easily checked out in such a way to visually check the inside after a reinforcing bar has been coupled.

Technical Solution

The present invention relates to a reinforcing bar coupler for a spiral reinforcing bar wherein a pair of spiral reinforcing bars are coupled on a straight line, which may include, but is not limited to, a protrusion accommodating groove which is formed at one side of the inner part thereof, and is screw-coupled to a spiral protrusion of the spiral reinforcing bar; and a loading part which has an inner diameter larger than an outer diameter of the spiral reinforcing bar, such that the end of the spiral reinforcing bar is accommodated therein without any rotations.

The protrusion accommodating groove may have a spiral orbit, both sides of which are different with respect to the center thereof.

The protrusion accommodating groove has spiral start points which are different at both ends of the reinforcing bar coupler.

The spiral start point of an end of the reinforcing bar coupler is set within a range of 10~350° in the circumferential direction from the spiral start point of the other end thereof.

An inspection hole is perforated in the center of the reinforcing bar coupler, while communicating with the inside thereof, the injection hole being employed to inspect the ends of the spiral reinforcing bars inserted in the inside.

Advantageous Effects

The reinforcing bar coupler for a spiral reinforcing bar according to the present invention is formed of a single component.

Thus, the management is easy, and the manufacturing cost can be saved a lot.

Moreover, a loading part larger than the outer diameter of the spiral reinforcing bar is provided at both inner sides, so the spiral reinforcing bar can be inserted and loaded at a predetermined depth before the engagement of the screw.

Thus, the coupling work performance and the work safety can be maximized.

And, the insertion depths of a pair of spiral reinforcing bars accommodated by a screw engagement method at both sides can be limited.

In this state, the temporal assembling of the spiral reinforcing bars is available, which makes it possible to maximize the convenience when in use.

Moreover, the coupling may be carried out in a state where a repulsive force has been generated since the ends of a pair of spiral reinforcing bars accommodated in the inside are abutting against each other.

Since the movements are limited after the coupling of a pair of spiral reinforcing bars has been completed, the safety and reliability can be promoted.

In addition, a defective assembling can be easily inspected, for example, in such a way to visually check the inside with eyes after the reinforcing bars have been coupled.

BRIEF DESCRIPTION OF DRAWINGS

FIG. 1 is a exploded perspective view illustrating the configuration of a conventional technology reinforcing bar coupler.

FIG. 2 is a view illustrating a use state of a conventional technology (the Korean utility model registration number 0409526) reinforcing bar coupler.

FIG. 3 is a view illustrating a use state of a reinforcing bar coupler for a spiral reinforcing bar according to the present invention.

FIG. 4 is a perspective view illustrating an exterior configuration of a reinforcing bar coupler for a spiral reinforcing bar according to the present invention.

FIG. 5 is across sectional view illustrating an interior configuration of a reinforcing bar coupler for a spiral reinforcing bar according to the present invention.

FIG. 6 is a left and right view illustrating a reinforcing bar coupler for a spiral reinforcing bar according to the present invention.

FIG. 7 is a left and right view illustrating a range of a spiral start point of a protrusion accommodating groove in a reinforcing bar coupler for a spiral reinforcing bar according to the present invention.

FIG. 8 is an overview view illustrating the whole configuration before a pair of spiral reinforcing bars are engaged in a reinforcing bar coupler for a spiral reinforcing bar according to the present invention.

FIG. 9 is a vertical cross-sectional view illustrating a configuration wherein a spiral reinforcing bar has been loaded at a loading part in a reinforcing bar coupler for a spiral reinforcing bar according to the present invention.

FIG. 10 is a vertical cross-sectional view illustrating a configuration wherein a reinforcing bar has been engaged at the left side in a reinforcing bar coupler for a spiral reinforcing bar according to the present invention.

FIG. 11 is a vertical cross-sectional view illustrating a configuration wherein a pair of reinforcing bars have been connected using a reinforcing bar coupler for a spiral reinforcing bar according to the present invention.

MODES FOR CARRYING OUT THE INVENTION

The configuration of a reinforcing bar coupler for a spiral reinforcing bar (hereinafter, referred to as "a reinforcing bar coupler 100) according to the present invention will be described with reference to FIGS. 3 and 4.

FIG. 3 shows a use state of a reinforcing bar coupler 100 for a spiral reinforcing bar according to the present invention. FIG. 4 shows an exterior configuration of a reinforcing bar coupler 100 for a spiral reinforcing bar according to the present invention.

Before the descriptions, the terms or words used throughout the specification and claims should not be interpreted as a typical and dictionary meaning, but should be interpreted as a meaning and concept which are most matched with the technical concepts of the present invention based on the principle where an inventor is able to appropriately define the concepts of a corresponding term to describe his invention in the best way.

In addition, the exemplary embodiments recited in the specification and the configurations illustrated in the configuration are provided only for illustrative purposes, not representing all the technical concepts of the present invention, for which it should be understood that there may be various equivalents and modifications which could substitute such concepts.

As illustrated in the drawings, the reinforcing bar coupler 100 according to the present invention is provided to connect a pair of spiral reinforcing bars (F) and is formed of a single component.

Moreover, the reinforcing bar coupler 100 is formed in a cylindrical shape the inside of which is open at its left and right sides, wherein an accommodation space 120 is formed long in the inside thereof to accommodate a pair of spiral reinforcing bars (F).

A protrusion accommodating groove 130 is formed sunk in a spiral shape at an inner circumferential surface of the accommodation space 120. The protrusion accommodating groove 130 is configured to screw-coupled with the spiral protrusion (F') formed in a spiral shape at the outer surface of the spiral reinforcing bar (F). It is formed over the whole inner circumferential surfaces of the reinforcing bar coupler 100.

If each spiral reinforcing bar (F) is inserted and rotated at both ends of the reinforcing bar coupler 100, the protrusion accommodating groove 130 will carry out the function of a female screw and will be engaged with the spiral protrusion (F'), and the reinforcing bar coupler 100 may couple a pair of the reinforcing bars (F) in the form where they are laid down on a straight line as illustrated in FIG. 3.

An inspection hole 110 may be formed in the center of the outer surface of the reinforcing bar coupler 100. The inspection hole 110 is employed to make it possible to inspect the inside of the accommodation space 120 after a pair of the spiral reinforcing bars (F) have been coupled, thus inspecting any defective assembling or non-coupled portions with eyes.

To this end, the inspection hole 110 may be preferably perforated from the outer surface of the reinforcing bar coupler 100 to the accommodation space 120. Since it needs to check if the end of each of a pair of the reinforcing bars (F) is inserted until the center of the inside of the accommodation space 120, it is preferably formed in the center of the reinforcing bar coupler 100.

The inspection hole 110 may provide a function to visually inspect from the outside of the reinforcing bar coupler 100 the portion where a pair of the spiral reinforcing bars (F) are abutting against each other when they are completely coupled.

The inspection hole 110 may be perforated multiple in number for the sake of easier inspection as long as it does not contribute to the decreased strength of the reinforcing bar coupler 100.

The reinforcing bar coupler 100 may be configured in such a way that it no longer rotates when each spiral reinforcing bar (F), which is inserted from both sides, is inserted at a predetermined depth.

This configuration is employed to allow a pair of the spiral reinforcing bars (F) to be inserted at a desired depth when they are inserted inside of the reinforcing bar coupler 100 by a screw engagement method. If it is rotated until it no longer rotates even when a worker carelessly does the work, the state where it has been inserted at the central portion of the reinforcing bar coupler 100, can be maintained.

The detailed configuration of the protrusion accommodating groove 130 will be described with reference to FIGS. 5 to 7.

FIG. 5 is a cross-sectional view illustrating an interior configuration of a reinforcing bar coupler 100 for a spiral reinforcing bar according to the present invention, and FIG. 6 is a left and right view illustrating a reinforcing bar coupler 100 for a spiral reinforcing bar according to the present invention, and FIG. 7 is a left and right view illustrating a range of a spiral start point (S1, S2) of a protrusion accommodating groove 130 in a reinforcing bar coupler 100 for a spiral reinforcing bar according to the present invention.

As illustrated in the drawings, a loading part 122 may be provided at both inner sides of the reinforcing bar coupler 100. The loading part 122 may contribute to an easier engagement of the spiral reinforcing bar (F) to the reinforcing bar coupler 100.

More specifically, the loading part 122 is referred to a component of the accommodation space 120 perforated inside of the reinforcing bar coupler 100 and may form an accommodation space 120 together with the accommodation part 124 wherein the spiral reinforcing bar (F) is accommodated. The loading part 122 may be formed at a predetermined depth.

More specifically, the loading part 122 may have an inner diameter larger than the maximum outer diameter (the outer diameter of the spiral protrusion (F')) of the spiral reinforcing bar (F), so it is able to guide the insertion in a state where the spiral reinforcing bar (F) does not rotate.

A stable loading can be secured through only a procedure where the insertion can be carried out without any rotation when the spiral reinforcing bar (F) is coupled to the reinforcing bar coupler 100, and the spiral engagement between the protrusion accommodating groove 130 and the spiral protrusion (F') may become available.

In the exemplary embodiment of the present invention, the loading part 122 may be configured to correspond to the inner diameter of the protrusion accommodating groove 130.

Meanwhile, the protrusion accommodating groove 130 is employed for the sake of a thread engagement with the spiral protrusion (F') and may has a spiral orbit wherein both sides are different about the center thereof.

The protrusion accommodating groove 130 may has a spiral orbit having the same pitch (A) at the left and right sides about the center of the reinforcing bar coupler 100; however the protrusion accommodating groove 130 formed after the left and right sides of the reinforcing bar coupler 100 are processed inward, may be formed to the central portion of the reinforcing bar coupler 100 and may have a spaced-apart distance (B) which is different from the pitch (A).

The pitch (A) may be set shorter as seen in FIG. 5 or may be longer than the spaced-apart distance (B) as long as it is in a range where it has a different dimension as compared to the spaced-apart distance (B).

The protrusion accommodating groove 130 formed at both sides of the reinforcing bar coupler 100 may be configured in such a way that it has different pitches (A) and outer diameters for the spiral reinforcing bars (F) of different dimensions to be coupled.

The spiral reinforcing bar (F) inserted along a spiral line into the inside through the left and right sides of the reinforcing bar coupler 100 can be inputted up to the central portion of the reinforcing bar coupler 100; however it no longer rotate and then stop where the different spiral orbits meet each other (the central portion of the reinforcing bar coupler 100).

The method for forming the protrusion accommodating groove 130 having different spiral orbits will be described with reference to FIGS. 6 and 7.

The left side drawing is referred to the left side view of FIG. 5, and the right side drawing is referred to the right side view of FIG. 5.

As illustrated in the drawings, when viewing from the left side of the reinforcing bar coupler 100, the spiral start point (S1: from the left end to the point where the processing of the protrusion accommodating groove 130 starts) may position at the upper side in the center of the reinforcing bar coupler 100.

Meanwhile, when viewing from the right side of the reinforcing bar coupler 100, the spiral start point (S2: from the right end to the point where the processing of the protrusion accommodating groove 130 starts) may position at the left side in the center of the reinforcing bar coupler 100.

Thus, if the protrusion accommodating groove 130 is formed as long as half of the total length of the reinforcing bar coupler 100 in the left and right directions, the points where spirals start may become different, for which the spiral orbits may deviate at the central portion of the reinforcing bar coupler 100, which causes the dimension of the pitch (A) to be different from the dimension of the spaced-apart distance (B).

According to this principle, if the spiral start point (S1), as illustrated in FIG. 7, is processed to position at the upper side in the center of the reinforcing bar coupler 100, the spiral start point (S2) may position in the region except for the region (C) in FIG. 7.

The region (C) is referred to the region determined considering the safety ratio to prevent the thread engagement with the protrusion accommodating groove 130 at the opposite side even through the spiral start point (S1) and the spiral start point (S2) has a little difference due to the characteristic where the spiral protrusion (F') of the spiral reinforcing bar (F) has a large pitch.

Therefore, the spiral start point (Si) at an end of the reinforcing bar coupler 100 is preferably formed within a range of 10~350° in the circumferential direction from the spiral start point (S2) of the other end.

Referring to FIGS. 8 to 10, the procedure to couple the spiral reinforcing bar (F) using the thusly constituted reinforcing bar coupler 100 will be described.

FIG. 8 is an overview view illustrating the whole configuration before a pair of spiral reinforcing bars (F) are engaged in a reinforcing bar coupler 100 for a spiral reinforcing bar according to the present invention, and FIG. 9 is a vertical cross-sectional view illustrating a configuration wherein a spiral reinforcing bar has been loaded at a loading part 122 in a reinforcing bar coupler 100 for a spiral reinforcing bar according to the present invention.

FIG. 10 is a vertical cross-sectional view illustrating a configuration wherein a reinforcing bar (F) has been engaged at the left side in a reinforcing bar coupler 100 for a spiral reinforcing bar according to the present invention.

FIG. 11 is a vertical cross-sectional view illustrating a configuration wherein a pair of reinforcing bars (F) have been connected using a reinforcing bar coupler 100 for a spiral reinforcing bar according to the present invention.

Referring to FIG. 8, a pair of spiral reinforcing bars (F) and a single reinforcing bar coupler 100 are prepared, and as illustrated in FIG. 9, any one of the spiral reinforcing bars (F) (a left side) is first screw-coupled.

The spiral reinforcing bar (F) is transferred in the right direction without any rotation and is inserted in the loading part 122. Since the loading part 122 has an inner diameter which is a little larger than the outer diameter of the spiral protrusion (F'), the spiral reinforcing bar (F) can be directly inserted in the loading part 122, and the moving angle is not large.

The spiral reinforcing bar (F) at the left side is rotated in the spiral direction while pushing in the right direction the spiral reinforcing bar (F) at the left side with respect to the reinforcing bar coupler 100, after which as illustrated in FIG. 10, the engagement of one spiral reinforcing bar (F) can be completed.

The spiral protrusion (F') of the spiral reinforcing bar (F) may enter while rotating in the spiral direction over the protrusion accommodating groove 130 formed at the inner left side with respect to the center of the reinforcing bar coupler 100, and since the protrusion accommodating groove 130 formed at the inner left and right sides of the reinforcing bar coupler 100 have different spiral orbits, the threads may be engaged up to the center thereof, so it no longer rotates in the rightward direction.

Thereafter, the remaining spiral reinforcing bar (F) is rotated through the right side of the reinforcing bar coupler 100 and is screw-coupled with the inside of the reinforcing bar coupler 100.

If the above procedure is completed, the coupling of a pair of the spiral reinforcing bars (F) using a single reinforcing bar coupler 100 can be completed, and a pair of the spiral reinforcing bars (F) may remain in a state where the ends of each of them are abutting against each other inside the reinforcing bar coupler 100.

Moreover, if a pair of the spiral reinforcing bars (F) are more rotated in the insertion direction, since a repulsive force generates in the opposite direction in a state where the ends are abutting against each other, a restricting force may increase between the spiral protrusion (F') and the protrusion accommodating groove 130 due to the repulsive force.

More specifically, the spiral protrusion (F') and the protrusion accommodating groove 130 can maintain an abutting state against the elliptical portion indicated by a dotted line in the enlarged view of FIG. 11 by means of the repulsive force generated by a pair of the spiral reinforcing bars (F).

The coupling of the spiral reinforcing bars (F) is completed through the aforementioned procedure, so a pair of the spiral reinforcing bars (F) can be reliably coupled like an integrated structure since the movements thereof are restricted in the opposite direction as well as the parting direction, for which a filler (not illustrated) to enhance the restricting force of the spiral reinforcing bar (F) and the reinforcing bar coupler 100 will not be used.

A worker or a supervisor is able to inspect if the ends of a pair of the spiral reinforcing bars (F) are abutting against each other or if the ends thereof position at the center in such a way to visually inspect the inside of the accommodation space 120 through the inspection hole 110 with eyes.

The right scope of the present invention is not limited to the exemplary embodiments described above, and a variety of modifications are available based on the present invention by a person having ordinary skill in the art within the right scope of the present invention.

For example, while the present invention has been described with respect to a pair of the spiral reinforcing bars (F) having the same pitches (A) and dimensions, and the positions of the spiral start points (S1 and S2) have been set different, so the spiral reinforcing bar (F) has been engaged up to the opposite side and then restricted from proceeding; however if it needs to couple the spiral reinforcing bars (F) having different pitches and dimensions, the processing depths of the protrusion accommodating grooves 130 at the left and right sides may be determined different within a scope where the left and right sides have different spiral orbits with respect to the center of the reinforcing bar coupler 100.

While the embodiment of the present invention has been described assuming that the loading part 122 has been provided at both sides of the reinforcing bar coupler 100; however it is obvious that the loading part 122 may be provided at any of both sides inside the reinforcing bar coupler 100, and the spiral reinforcing bar (F) could be first assembled where the loading part 122 is not formed, and then the remaining spiral reinforcing bar (F) could be loaded at the loading part 122, thus securing a safe engagement.

INDUSTRIAL APPLICABILITY

The reinforcing bar coupler for a spiral reinforcing bar according to the present invention is formed of a single component.

Moreover, a pair of spiral reinforcing bars accommodated at both sides by a thread engagement method may be inserted at a predetermined depth and then the coupling thereof may be completed.

Since the reinforcing bars having different standards can be easily coupled when it needs to variously change and adapt the pitches and inner diameters of the protrusion accommodating grooves, the coupling may be carried easily, and the management is easy, for which the present invention may be used in a wide range of industry fields.

Moreover, since a repulsive force may be generated in a state where the ends of a pair of spiral reinforcing bars accommodated in the inside are abutting against each other, the movements and loosening can be prevented after the coupling of the reinforcing bars, so the safety and reliability with respect to the structure can be obtained.

In addition, any defective assembling can be visually inspected with eyes in such a way to inspect the inside after the coupling of the reinforcing bars has been completed, so anyone is able to accurately couple the reinforcing bars irrespective of their skills, thus providing a reliable coupling, which may cause a great ripple effect in the industry.

What is claimed is:

1. A reinforcing bar coupler for a spiral reinforcing bar wherein a pair of spiral reinforcing bars are coupled on a straight line, comprising:
    a protrusion accommodating groove which is formed at one side of an inner part thereof, and is screw-coupled to a spiral protrusion of the spiral reinforcing bar; and
    a loading part formed to have an inner diameter larger than an outer diameter of the spiral reinforcing bar, such that the end part of the spiral reinforcing bar is accommodated therein without rotation,
    wherein the protrusion accommodating groove has a spiral orbit formed of a first spiral orbit and a second spiral orbit each having a same pitch at left and right sides of the reinforcing bar coupler about a center of the reinforcing bar coupler, and the protrusion accommodating groove is formed to a central portion of the reinforcing bar coupler and has a spaced-apart distance at the central portion of the reinforcing bar coupler,
    wherein the protrusion accommodating groove has a first spiral start point of the first spiral orbit that indicates a point where the processing of the protrusion accommodating groove starts at a left end of the protrusion accommodating groove and a second spiral start point of the second spiral orbit that indicates a point where the processing of the protrusion accommodating groove starts at a right end of the protrusion accommodating groove, and
    wherein the first orbit start point is different in an angle position in the circumferential direction from the second orbit point such that the first spiral orbit and the second spiral orbit deviate from each other at the central portion of the reinforcing bar coupler and the spaced-apart distance is different from the pitch.

2. The coupler of claim 1, wherein the first spiral start point of the protrusion accommodating groove of the reinforcing bar coupler is set within a range of 10~350° in the circumferential direction from the second spiral start point of the protrusion accommodating groove of the reinforcing bar coupler.

3. The coupler of claim 2, wherein an inspection hole is perforated in the center of the reinforcing bar coupler, while communicating with the inside thereof, the injection hole being employed to inspect the ends of the spiral reinforcing bars inserted in the inside.

* * * * *